June 30, 1959     E. C. VROMAN     2,892,651

SAND TRAP

Filed Jan. 17, 1957

INVENTOR.
*Erwin C. Vroman*
BY
*Dodge and Son*
*Attorneys*

_United States Patent Office_

2,892,651
Patented June 30, 1959

2,892,651

SAND TRAP

Erwin C. Vroman, Watertown, N.Y., assignor to The New York Air Brake Company, a corporation of New Jersey Application January 17, 1957, Serial No. 634,713

7 Claims. (Cl. 291—11)

This invention relates to rail sanders and particularly to devices of this class in which an air jet is used in conjunction with a venturi throat to propel the sand and also to control the rate of feed. These are sometimes called ejector-type sanders. With the growing use of sanding economy in the use of sand is a matter of increasing importance to the railroads.

It is possible to design and install a trap so that initially the rate of feed will be stable, and it is possible to design a trap so that its rate of feed is adjustable, within reasonable limits, to compensate for differences in installation.

Railroads desire a sand trap which can be installed in a wide variety of ways and without any adjustment give the same feed rate, not only at installation but also throughout the life of the device.

The first of the above requirements, has not been met heretofore because even the best sand traps of the prior art will give different feed rates because of differences in installation. The present invention solves that difficulty.

More important still, the invention offers a trap of predictable initial performance which will maintain its predicted rate throughout its life. It can do so because the scouring action of the sand has no rate-changing effect.

The invention is the result of long and painstaking study, and turns on determination of the fact that disturbances affecting rate of feed arise from variations of the rate at which air is drawn into the trap through the column of approaching sand. It had long been assumed that since ejector-type traps have open air intakes, all the induced air entered through such intake. This misleading assumption lead designers away from a simple solution of the problem which applicant has now discovered. He provides means which control the supply of air to the lower portion of the sand column in such a way that the length of the sand column has no significant effect.

The invention accomplishes the desired result without using a single moving part, or even an adjustable part.

The invention will now be described by reference to the accompanying drawing. In the drawing.

Figure 1:
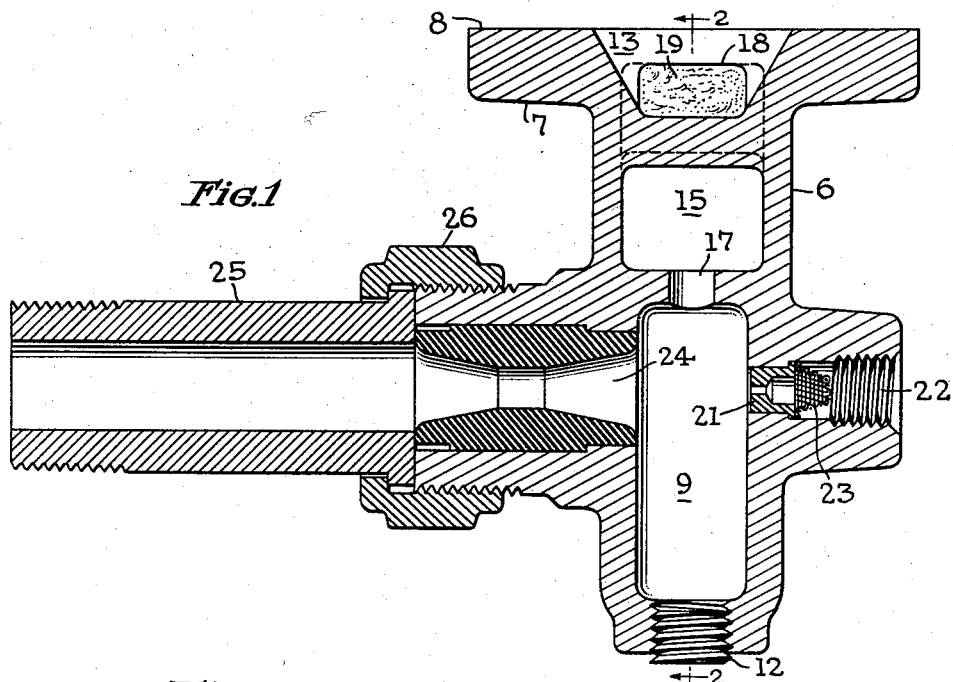
Fig. 1 is a vertical axial section through the venturi and related nozzle, the plane being indicated by the line 1—1 in Fig. 2.

The body 6 of the trap is a casting which has mounting flanges 7 and a mounting face 8. The sand chamber 9 has a flat bottom 11 with threaded plugs 12. A sand supply passage 13 leads from the top mounting face 8 to the bottom 11 and communicates laterally with chamber 9, through a moderately constricted opening 14 in which a flow-checking "toe" tends to form. Thus passage 13 operates full of sand and affords a choked flow into chamber 9.

Also formed in body 6 is an atmospheric air inlet chamber 15 with an inclined drip rim 16 to shed rain water. Two branches lead from this chamber. The first branch is a drilled port 17 of appropriate size which functions as a nozzle, directing a sand-stirring air jet downward against the bottom 11 of sand chamber 9. It is shown centered on the axis of the venturi and the venturi throat hereinafter mentioned, and this precise arrangement, though not strictly essential, is considered desirable. The second branch is a cored passage 18 leading into sand passage 13. Passage 18 is filled with a porous felt plug 19 of appropriate texture.

Figure 2:
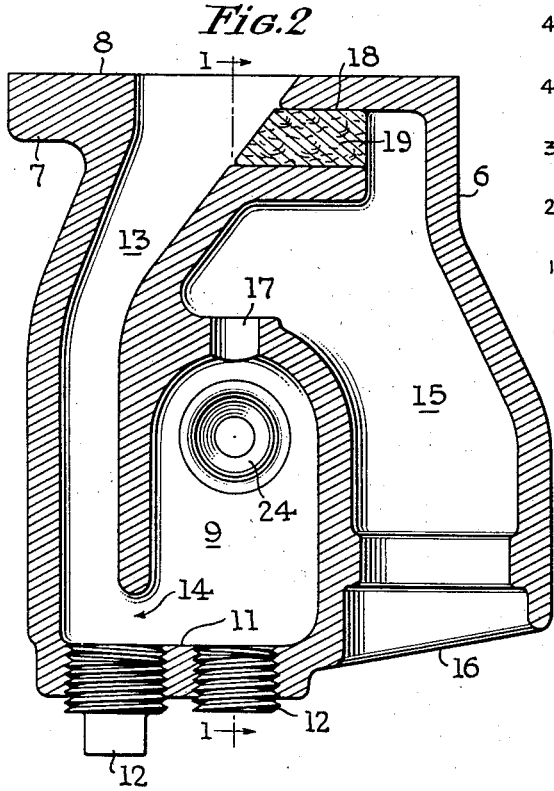
Fig. 2 is a transverse section on the line 2—2 of Fig. 1.

Directed across chamber 9, which as viewed in Fig. 1 is less in its horizontal dimension than it is as viewed in Fig. 2, is a nozzle 21 for the propelling jet. An elastic pressure fluid, (customarily compressed air) is used. The threads 22 receive the end of the air supply pipe. A screen is shown at 23. The customary sander control valve (not illustrated) is used to control the supply of compressed air and this may be derived from the main reservoir of the brake system.

The air jet is directed axially into the open end of the rubber venturi throat 24. This discharges into the sander pipe 25 which directs the air and entrained sand to the rail. A union nut 26 connects pipe 25 with housing 6. The use of a propelling jet and related venturi is known in the art. So also is the broad idea of a jet to stir sand in the trap chamber.

In the usual installation, sand is supplied to a passage, such as 13, through a pipe (say 1½ inches in diameter). The length of such pipes varies widely, and with prior-art sand traps, the rate of said delivery varied with each installation.

Close study has disclosed the cause of the difficulty. When the jet acts, air in quantity is drawn through passage 13 with the sand and affects the sand delivery rate. Supply pipes of different lengths admit air at different rates, such air flowing into the trap with the sand.

Applicant's solution of the resulting problem is to limit the penetration of the suction produced by the ejector effect of the jet and venturi so that suction can be effective only through a definite length of sand column. Applicant's preferred method of accomplishing this is to admit air into the sand column at a point near to, but preferably below, the connection with the sand supply pipe and at a substantial distance above the point at which the sand in the column enters the pocket in the trap. In the absence of special precautions, this introduced a disturbing stirring effect. To supress the stirring effect, applicant inserts a flow-diffusing porous plug 19 in the passage 18. This plug is of such size and texture as to pass all the air that can be drawn through the passage 13 when sand-filled and still diffuse the flow over such a large area that undesired stirring will not occur. The effect is to limit severely or even supress the depression of pressure in the sand pipe above the trap.

Figure 3:
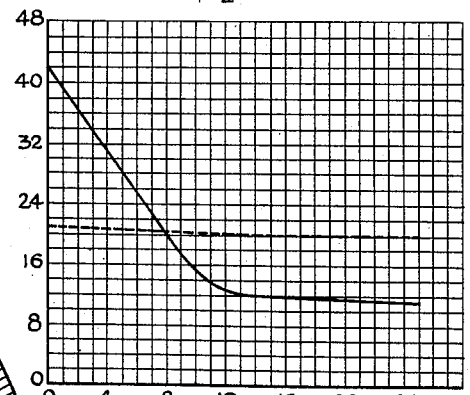
Fig. 3 is a graph indicating the effect on the flow rate of the length of the sand approach column, for the best prior art trap known to this applicant and for the trap of the present invention.

That the described arrangement stabilizes performance is indicated in Fig. 3 which summarizes the results of extensive tests. In the plot abscissae are the length of the sand supply pipe (1½ inch diameter) in inches. Ordinates are sand fed in ounces per minute. The solid line portrays the delivery characteristic of the best prior-art ejector trap known to applicant. The dotted line similarly indicates the delivery characteristic of the trap here described and claimed. Obviously the new trap is not significantly affected by changes in the length of the sand supply pipe. Its sand rate is fixed by its form. Nothing requires adjustment during or after installation.

Direction of the stirring jet against the bottom of the sand chamber results in minimum wear because the bottom is nearly always sand-covered, and this assures that changes of feed-rate will never be caused by erosion.

It is contemplated that traps will be manufactured in different sizes, and dimensioned so as to afford different characteristic feed-rates.

The patent application drawing as filed is a reproduction of the assembly drawing of a trap which has been demonstrated to have a feed range between one pound of sand per minute and one-half pound per minute, the rate being pre-set solely by choice of the jet diameter of the nozzle 21. Thus the nozzle is the only component which must be changed to establish different feeds within the stated feed limits. However, the same trap body can be used to produce traps having rates up to two pounds per minute, by changing the jet diameter of the nozzle 21 and the diameter of port 17.

Other modifications are possible. For example, it is possible to modify performance of a particular design by selecting different lengths for the passage 13 below the cored passage 18.

The various effects above mentioned are interrelated to some extent, so that various combinations can be developed by trial. Hence, a considerable range of equivalents is afforded.

What is claimed is:

1. In a sanding trap, the combination of a housing enclosing a sand-collecting chamber and having near its top an inlet adapted to communicate with a sand supply duct, said housing defining a sand flow path which leads from said inlet through a sand-flow retarding portion into the lower portion of said chamber; pressure-fluid-operable ejector means for withdrawing from an upper portion of said chamber and propelling toward a point of use extenal to the chamber, air and suspended sand; sand stirring means comprising a flow-directing port having its entrance end supplied with air at substantially atmospheric pressure for causing sand particles in said chamber to become suspended in air therein; and means affording a flow diffusing porous inlet for admitting air to said sand flow path in advance of said flow-retarding portion and substantially at atmospheric pressure.

2. A sanding trap as defined in claim 1 in which the stirring means comprises a nozzle having an atmospheric inlet, said nozzle being directed downward in said chamber to discharge in a path which intersects the ejector flow-path.

3. In a sanding trap, the combination of means enclosing a sand-collecting chamber and defining a gravity flow path for a column of sand leading from a source of supply to the lower portion of said chamber; means including a venturi throat affording a discharge path from the upper portion of said chamber to a point of use; means for directing a jet of elastic pressure-fluid in an axial direction into the chamber end of said throat; means affording an intake for the inward flow of atmospheric air induced by the ejector effect of said jet and throat, said intake means leading to two outlets, the first of which serves to deliver sand-stirring air into said sand-collecting chamber, and the second of which leads into said gravity flow path at a substantial distance above the lower end thereof; and a flow-diffusing mass confined in said second outlet.

4. The combination defined in claim 3 in which the second outlet enters the gravity flow path at an elevation sufficiently above the lower end of the gravity flow path to cause the sand in said gravity path to offer substantial resistance to air flow, and the flow-diffusing mass is such as substantially to neutralize the residual suction effective at the second outlet and produced by the ejector effect of the jet and venturi throat, whereby suction is rendered substantially ineffective above said second outlet.

5. The combination defined in claim 3 in which the first outlet directs its sand-stirring air downward against sand in the bottom of said chamber.

6. The combination defined in claim 4 in which the first outlet directs its sand-stirring air downward against sand in the bottom of said chamber.

7. A pneumatic ejector sander comprising in combination a housing enclosing a chamber; means defining a combining tube leading from said chamber toward a point of use; a nozzle adapted to direct a jet of compressed air into the end of said combining tube, induce flow of air and sand through said combining tube and discharge it against atmospheric pressure; means enclosing a sand-confining gravity path from a sand source to said chamber and having a flow-retarding portion adjacent its entrance into said chamber; and means affording a flow diffusing inlet from the atmosphere to said sand-confining path in advance of said flow-retarding portion.

References Cited in the file of this patent
UNITED STATES PATENTS

| | | |
|---|---|---|
| 1,864,057 | Frantz et al. | June 21, 1932 |
| 2,243,243 | Campbell | May 27, 1941 |
| 2,431,382 | Elsworth | Nov. 25, 1947 |
| 2,568,972 | Safford | Sept. 25, 1951 |